(No Model.)

G. B. N. DOW.
VEGETABLE FORK.

No. 540,958. Patented June 11, 1895.

Witnesses
Edwin G. McVee,
Jennie B. Perry.

Inventor
Geo. B. N. Dow.
by Philip W. Avirett
his Attorney

United States Patent Office.

GEORGE B. N. DOW, OF MANCHESTER, ASSIGNOR OF THREE-FOURTHS TO THOS. F. HARKIN, WILLIAM A. J. GILES, AND DANIEL GILES, OF CONCORD, NEW HAMPSHIRE.

VEGETABLE-FORK.

SPECIFICATION forming part of Letters Patent No. 540,958, dated June 11, 1895.

Application filed March 13, 1895. Serial No. 541,613. (No model.)

*To all whom it may concern:*

Be it known that I, GEORGE B. N. DOW, a citizen of the United States, and a resident of Manchester, in the county of Hillsborough and State of New Hampshire, have invented certain new and useful Improvements in Vegetable-Forks; and I do hereby declare the following to be a full, clear, and exact description of the invention, such as will enable others skilled in the art to which it appertains to make and use the same.

My invention relates to improvements in forks, the object of the same being to provide a device of this character which may be employed to lift vegetables or other articles of food and to discharge the same from the ends of the tines of the forks by pressing the parts of the same together.

The invention consists of a handle piece formed of wire, sheet metal, or other materials bent at about its central portion forming a spring joint; tines secured to one of the arms thus formed and rods pivoted to the end of the other arm, having loops formed in their outer end which are adapted to surround said tines so that by compressing the arms of the handle, said rods are forced outwardly on said tines and the matter held on the end of the fork forced off of the same. On one of the arms of which the handle is made up I form a loop or finger hole by means of which the same may be securely held by the operator.

In a modified form of my invention I propose to make my entire fork including the tines, of the two arms of the handle and the rods operating with the tines out of continuous strands of wire.

The invention is clearly illustrated in the accompanying drawings, in which—

Figure 1:
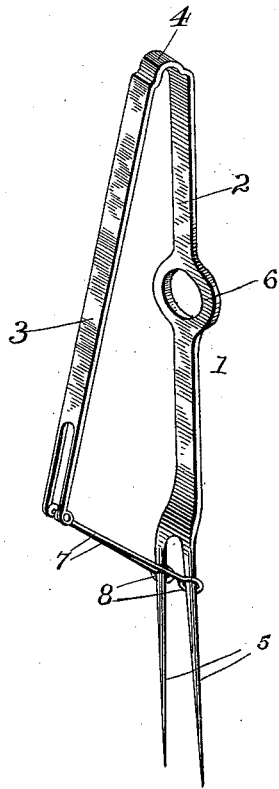
Figure 2:
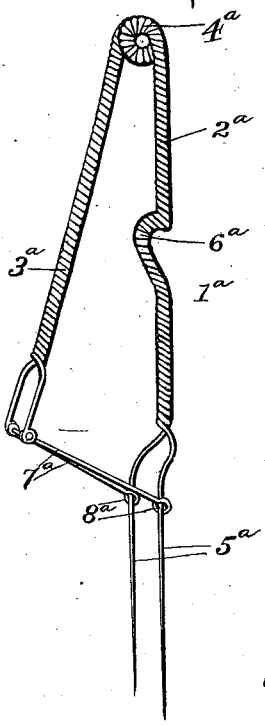

Figure 1 represents a perspective view of my device; Fig. 2, a similar view of a modified form of the same.

Like reference numerals indicate like parts in the two views.

By reference to the drawings it will be seen that 1 represents the handle of my fork formed of two arms, 2 and 3 respectively, which are connected at their ends by means of a coiled spring 4 or if desired the two arms may be made of a single piece of metal bent at the point 4 and forming a spring at that point. The arm 2 has secured to its outer ends, tines 5 and is also formed at about its center with a finger loop or opening 6 as clearly shown. Pivoted to the outer ends of the arms 3 are two rods or bars 7 having loops 8 formed in their ends through which the tines 5 of the fork pass. By this construction it will be seen that vegetables or other matter may be raised by the tines 5 and by depressing arm 3 of the handle the rods 7 are forced outwardly and the material discharged from the end of the fork. The spring 4 acts to return the parts to their normal positions and the loop 6 affords a ready means of gripping and holding the fork.

In the form shown in Fig. 2 all the parts of the device are made of continuous strands of wire, two being shown in this instance. The finger loop $6^a$ in the handle $1^a$ in this form of construction is somewhat different from that shown in Fig. 1 in that it is yoke shaped. The strands of the wire are twisted to form the arms of the handle and are bent upon themselves to form the spring $4^a$. The tines $5^a$, the rods $7^a$ and loops $8^a$ are integral with the wire of which the arms $2^a$ and $3^a$ are made up. The ring forming the spring $4^a$ may in addition to its ordinary function be used for hanging the fork upon a rack or nail.

Having now described my invention, what I claim as new, and desire to secure by Letters Patent, is—

1. As an article of manufacture, the herein described fork consisting of a pair of arms; a spring connecting the outer ends of said arms; tines secured to the front end of one of the said arms and rods pivoted to the outer end of the other arm having loops thereon surrounding said tines, substantially as and for the purpose described.

2. As an article of manufacture, the herein described fork consisting of a pair of arms one of which is provided with a finger loop and a spring connecting the outer ends of said arms; tines secured to the other end of one of said arms; rods pivoted to the outer end of the other of said arms; loops on the ends of said rods adapted to surround said arms thereby compressing said tines said rods will be forced outwardly on said tines substantially as and for the purpose described.

3. As an article of manufacture the herein described fork made up of continuous strands of wire twisted to form the two arms of the handle and a coil at its center forming a spring for normally holding said arms apart, tines integral with one of said arms and rods integral with the other having loops formed in the outer ends of said arms, substantially as and for the purpose described.

In testimony whereof I have signed this specification in the presence of two subscribing witnesses.

GEORGE B. N. DOW.

Witnesses:
S. G. LANE,
ANNIE GILES,